United States Patent
Bates

(10) Patent No.: US 7,553,582 B2
(45) Date of Patent: Jun. 30, 2009

(54) GETTERS FOR THIN FILM BATTERY HERMETIC PACKAGE

(75) Inventor: John B. Bates, Oak Ridge, TN (US)

(73) Assignee: Oak Ridge Micro-Energy, Inc., Oak Ridge, TN (US)

(*) Notice: Subject to any disclaimer, the term of this patent is extended or adjusted under 35 U.S.C. 154(b) by 255 days.

(21) Appl. No.: 11/533,490

(22) Filed: Sep. 20, 2006

(65) Prior Publication Data

US 2008/0003493 A1    Jan. 3, 2008

Related U.S. Application Data

(63) Continuation-in-part of application No. 11/162,311, filed on Sep. 6, 2005.

(51) Int. Cl.
*H01M 2/08* (2006.01)
*H01M 10/34* (2006.01)

(52) U.S. Cl. .................. 429/57; 429/66; 429/185; 29/623.2

(58) Field of Classification Search .......... 429/57, 429/66, 162, 185; 29/623.2
See application file for complete search history.

(56) References Cited

U.S. PATENT DOCUMENTS

| 4,448,860 | A  | * | 5/1984 | von Alpen et al. ........... 429/57 |
| 6,902,844 | B2 | * | 6/2005 | Yageta et al. ............... 429/185 |
| 6,994,933 | B1 | * | 2/2006 | Bates ........................ 429/162 |
| 2005/0084746 | A1 | * | 4/2005 | Heller .................... 29/623.2 X |
| 2005/0147877 | A1 | * | 7/2005 | Tarnowski et al. .......... 429/162 |
| 2007/0037058 | A1 | * | 2/2007 | Visco et al. ............ 429/185 X |
| 2007/0042264 | A1 | * | 2/2007 | Desilvestro et al. ........ 429/185 |

* cited by examiner

*Primary Examiner*—Stephen J. Kalafut
(74) *Attorney, Agent, or Firm*—Luedeka, Neely & Graham, PC

(57) ABSTRACT

A method for improving the useful life of a thin film lithium-ion battery containing a solid electrolyte and an anode that expands on charging and long life batteries made by the method. The method includes providing a hermetic barrier package for the thin film battery that includes an anode expansion absorbing structure and at least one film getter.

31 Claims, 3 Drawing Sheets

GETTERS FOR THIN FILM BATTERY HERMETIC PACKAGE

RELATED APPLICATION

This application is a continuation in part of application Ser. No. 11/162,311 filed Sep. 6, 2005, now pending.

FIELD

The disclosure relates to thin film batteries and in particular to improved long-life thin film battery packages including getters and methods for making improved long-life thin film battery packages.

BACKGROUND AND SUMMARY

Thin-film rechargeable batteries have numerous applications in the field of microelectronics. For example, thin-film batteries may provide active or standby power for microelectronic devices and circuits. Active power source applications of the thin-film battery include, for example, implantable medical devices, remote sensors, wireless sensors, semiconductor diagnostic wafers, automobile tire sensors, miniature transmitters, active radio frequency identification (RFID) tags, smart cards, and MEMS devices. Standby power source applications of thin-film batteries include non-volatile CMOS-SRAM memory products such as memory ships for computers, sensors, and passive RFID tags.

In a battery, a chemical reaction takes place between an anode and cathode by interaction of the anode and cathode through an electrolyte that may be a solid or liquid. Liquid organic electrolytes used in conventional lithium-ion batteries pose safety problems because the electrolytes are flammable and are not tolerant to temperatures above about 130° C. The attractiveness of thin-film batteries over conventional batteries is that the electrolyte is a solid or non-flowable material rather than a liquid. Of the solid electrolytes, thin-film batteries typically employ glassy ceramic electrolytes. Solid electrolytes are desirable in cells or batteries where liquid electrolytes may be undesirable, such as in implantable medical devices. Preferred solid electrolytes include materials that are amorphous solids with high melting temperatures (greater than about 900° C.), electrically insulative and ionically conductive.

One of the challenges for thin film battery manufacturers is to provide a thin film battery having solid electrolytes that will have an extended life. An extended life is particularly difficult to obtain with thin film batteries containing anode materials that are highly reactive with oxygen and/or water or water vapor. Various barrier materials have been applied to thin film batteries to reduce the reactivity of the anode materials toward oxygen and/or water or water vapor. However, such barrier materials have met with limited success.

For example thin film batteries must be sealed or packaged in barrier materials in order to be able to operate in an air environment for a practical length of time. A suitable package must limit the permeation of oxygen and water vapor to such a small level as to allow at least 80% of the battery's capacity to be available after months to years of storage and/or operation. Thin film batteries can be stored in dry environments in which the relative humidity is sufficiently low that water vapor permeation is not a life-limiting factor. However, exposure to air reduces battery life to a few days if oxygen permeation is not restricted to a sufficiently low level by a suitable barrier package. In applications such as automobile tire sensors wherein wireless sensors including a thin film battery power source are imbedded in the sidewalls of the tire, thin film batteries also must be protected from hydrostatic pressure.

A thin film encapsulation process may be a suitable method for hermetically sealing a thin film battery, because the encapsulation layers may be deposited using the same equipment employed in making the batteries. However, silicon, tin, and silicon-tin alloy anodes of thin film lithium-ion batteries may expand uniaxially along the orthogonal direction to the film by over 250% during a charge step. Such expansion strains the protective encapsulation material to the point of fracture allowing oxygen and water vapor to rapidly reach the anode. While a polymer film may be able to accommodate the strain imposed by an expanding anode, a polymer film alone does not provide a sufficient barrier to oxygen and water vapor.

As advances are made in microelectronic devices, new uses for thin-film batteries continue to emerge. Along with the new uses, there is a need for high performance thin-film batteries having improved life. In particular, there is a need for rechargeable thin film batteries that have a life approaching at least five years or longer. Accordingly, there continues to be a need for improved hermetic seals for thin film batteries that enable use of such long life batteries in new applications. A need also exists for reducing the undesirable effects of oxygen and/or water or water vapor that becomes trapped within a sealed thin film package encapsulating a battery. There is also a need for batteries that are able to withstand hydrostatic pressures above atmospheric pressure.

With regard to the above, there is provided in one embodiment a method for improving the useful life of a thin film battery containing a solid electrolyte and an anode that expands on charging and long life batteries made by the method. The method provides a hermetic barrier package for the thin film battery that includes an anode expansion absorbing structure and at least one thin film getter disposed on an interior surface of a chamber defined by the hermetic barrier package. An alternative embodiment of the method includes providing at least one thick film getter instead of or in addition to the at least one thin film getter.

Another embodiment of the disclosure includes a long-life thin film battery package containing a solid electrolyte and an anode that expands on charging. The thin film battery package includes a hermetic barrier, an anode expansion absorbing structure and at least one thin film getter disposed on an interior surface of a chamber defined by the hermetic barrier. An alternative embodiment of the thin film battery package includes at least one thick film getter instead of or in addition to the at least one thin film getter.

Yet another embodiment of the disclosure provides a method of making multiple long-life thin film battery packages on a single substrate. The method includes the step of depositing battery layers including cathodes, electrolytes, and anodes through appropriate masks onto the substrate. A hermetic seal is constructed to substantially complete each of the battery packages. Each hermetic seal has an anode expansion absorbing structure. At least one of the thin film battery packages includes at least one thin film getter, at least one thick film getter, or at least one thin film getter and at least one thick film getter disposed on an inner surface of the volume defined by a hermetic sealing step. The open circuit voltage and resistance of each of the thin film battery packages is determined using a wafer prober in conjunction with a programmable electrometer to identify rejected battery packages. Rejected battery packages are ink marked, and the substrate is diced to provide a plurality of thin film batteries.

In still another embodiment, the disclosure includes a method for making a thin film battery package by attaching the components of a thin film battery to a liquid crystal polymer substrate, encapsulating the thin film battery components with a liquid crystal polymer lid including at least one film getter, and substantially sealing the thin film battery components within the liquid crystal polymer substrate and liquid crystal polymer lid.

An advantage of the disclosed embodiments is that improved hermetic seals for thin film batteries having anodes that greatly expand on charging may be provided. While conventional thin film battery packages containing lithium anodes and other anodes that do not greatly expand on charging may use conventional hermetic seals, thin film battery packages that have anodes that expand over about 200 percent of their height may benefit from the improved hermetic seals and sealing methods provided herein.

An additional advantage of some of the embodiments is the presence of one or more getters (including thin film and/or thick film). The presence of one or more getters acts to minimize the undesirable effects of any oxygen and/or water vapor that remains trapped inside the substantially sealed hermetic barrier package.

BRIEF DESCRIPTION OF THE DRAWINGS

Further advantages of the disclosed embodiments will become apparent by reference to the detailed description when considered in conjunction with the figures, wherein like reference numbers indicate like elements throughout, and wherein.

DETAILED DESCRIPTION OF EXEMPLARY EMBODIMENTS

It has been found that thin anode films of sputtered deposited amorphous silicon undergo a volume expansion of about 300 volume % as lithium is inserted into the films from a composition with 0 atomic % Li to the final composition of the saturated alloy, $Li_{4.4}Si$ (i.e. $Li_{22}Si_5$) during a thin film battery charging operation. For a thin film lithium-ion battery with a silicon anode, the charge step may be represented by the formula $$8.8LiCoO_2 + Si = 8.8Li_{0.5}CoO_2 + Li_{4.4}Si \qquad (1)$$

Because the thin film batteries are bonded to a solid substrate, most of the anode expansion manifests itself as an increase in the height of the anode by over 250%. Similar results are obtained with tin anodes as the lithium content ranges from 0 to $Li_{4.4}Sn$.

If the $LiCoO_2$ cathode is 30,000 Angstoms thick, for example, the minimum thickness of a silicon anode prior to charging that is required to achieve a fully saturated single phase alloy ($Li_{22}Si_5$) at the end of the charge step is about 2120 Angstroms. During the charging step, the thickness of the silicon anode increases from 2120 Angstroms to about 5300 Angstroms.

The percentage expansion of the silicon anode may be reduced by increasing the thickness of the anode so that the alloy formed at the end of the charge step contains less atomic percent lithium, however, the operating voltage and therefore energy of such a battery may be correspondingly reduced. For example, if the final composition of the anode were $Li_{1.7}Si$, then the silicon anode thickness required prior to charging is 5485 Angstroms to achieve full capacity of the cathode. After charging, the anode thickness increases by a factor of about 1.2 to 6582 Angstroms. While the capacity remains the same, the energy is lowered by about 50% due to a lower average cell voltage. Although the strain from anode expansion is reduced with a thicker silicon anode, nevertheless, the stress induced by the anode expansion still exceeds the yield stress of conventional materials used for encapsulating thin film batteries.

In view of the problems of anode expansion during charging of lithium-ion thin film batteries using silicon and tin anodes, for example, improved hermetic barrier packages and methods for hermetically sealing thin film batteries are described herein. An important component of the hermetic barrier package is that the package contains an anode expansion absorbing structure. Exemplary embodiments of such anode expansion absorbing structures are illustrated by reference to FIGS. 1-5.

Figure 1:
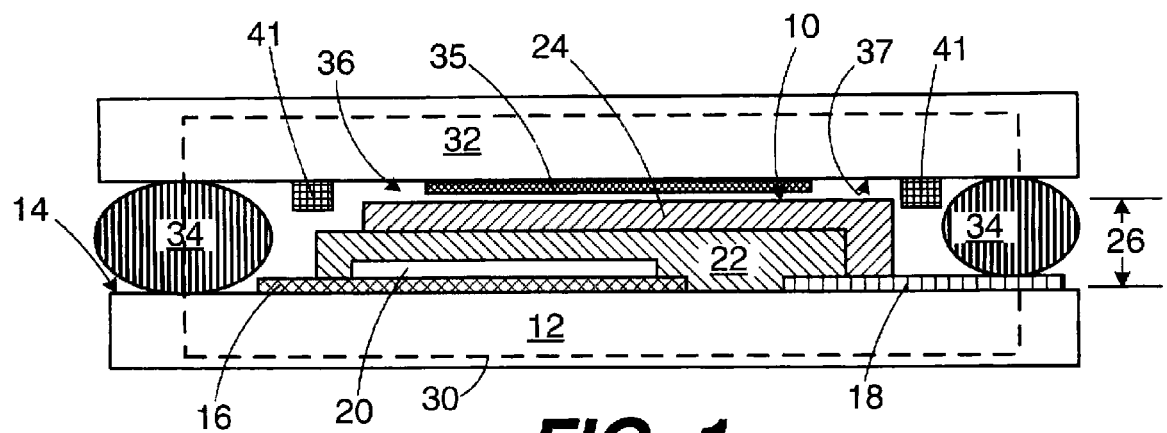
FIG. 1 is a cross-sectional view, not to scale, of a thin film battery package including a thin film getter that has been hermetically sealed according to a first embodiment of the disclosure.

In a first embodiment, a thin film battery 10 (desirably a lithium ion thin film battery) is provided on a solid substrate 12 having a support surface 14 as illustrated in FIG. 1. A cathode current collector 16 is deposited on the support surface 14 of the substrate 12. An anode current collector 18 is provided on the support surface 14 of the substrate in a spaced-apart location relative to the cathode current collector 16. A cathode 20 is deposited on a portion of the cathode current collector 16. A solid electrolyte 22 is deposited over the cathode 20, on a portion of the support surface 14 of the substrate 12, and on a portion of the anode current collector 18. Next, an anode 24 is deposited on the electrolyte 22 and a portion of the anode current collector 18. In an alternative construction technique especially useful for lithium-ion batteries, the anode current collector is deposited over the anode in a shape that includes a tab 18 for making electrical connection to the battery. The components of the thin film battery are referred to herein as the thin film battery stack 26. The thin film battery stack 26 has a maximum thickness of less than about 7 microns measured from the support surface 14 to the highest point of the battery stack 26 above the support surface 14.

The techniques for making thin film lithium, lithium-ion, and lithium-free lithium batteries, such as the battery 10 are described, for example, in the U.S. Pat. No. 5,567,210 to Bates et al., U.S. Pat. No. 5,612,152 to Bates, U.S. Pat. No. 6,168,884 to Neudecker et al., U.S. Pat. No. 6,242,132 to Neudecker et al. U.S. Pat. No. 6,423,106 to Bates, U.S. Pat. No. 6,818,356 to Bates, and the scientific literature. The construction as illustrated in FIG. 1 is such that the uppermost active layer is the anode 24. It is understood that the construction of the battery 10 from the anode 24 to the substrate 12 is the same as illustrated in FIG. 1 and described in the patent and scientific literature. The foregoing patents are incorporated by reference as if fully set forth herein.

Figure 2:
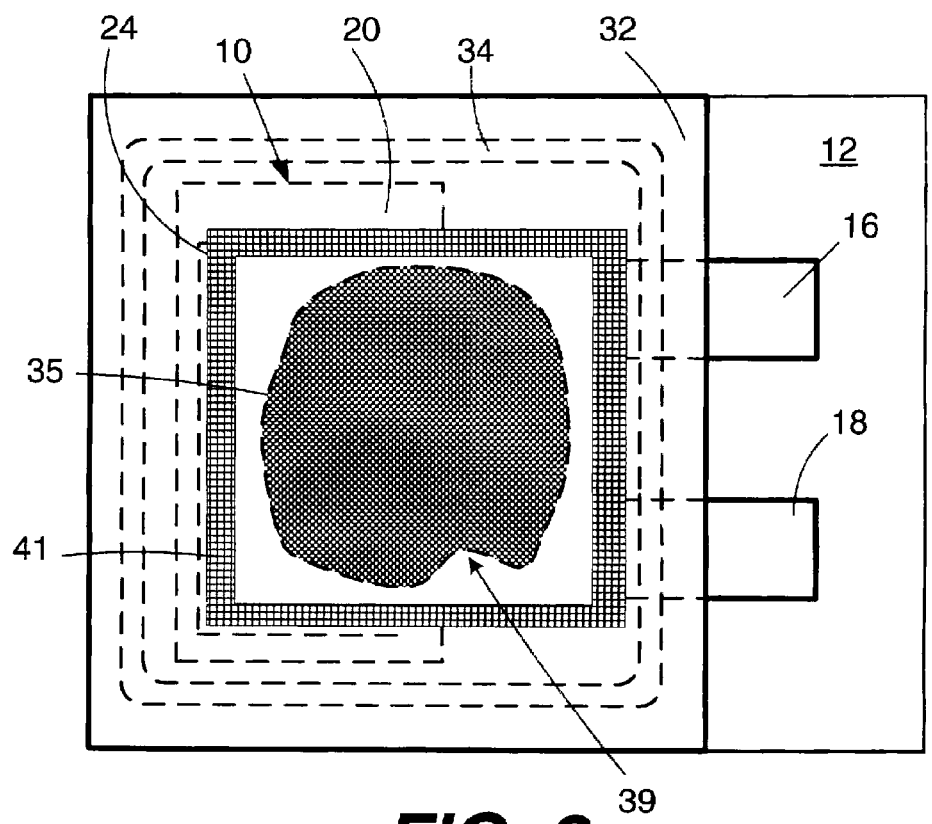
FIG. 2 is a plan view, not to scale, of a thin film battery package including a thin film getter that has been hermetically sealed according to the first embodiment of the disclosure.

In the first embodiment illustrated in FIGS. 1 and 2, a hermetic package 30 includes cover or lid 32 that is sealed to the current collectors 16 and 18 and the support surface 14 of the substrate 12 using an adhesive 34 such as an epoxy or other adhesive material having suitable barrier properties. The cover 32 and adhesive 34 are disposed over the thin film battery 10 in a manner that allows for expansion of the anode 24 during a battery charge step. Accordingly, there may be a gap 36 between the cover 32 and the anode 24 ranging from about 20 to about 160 microns (μm) depending on the thickness of the adhesive 34. As shown in FIG. 2, the adhesive 34 circumscribes the thin film battery 10 components and provides a substantially water vapor and air impermeable seal with the cover 32. In an exemplary embodiment, a thin film getter 35 is disposed on an interior surface of the hermetic package 30, typically, a surface 37 of the cover 32.

In this embodiment, the cover 32 is relatively thick and is made of a dense material, e.g. glass, ceramic, or metal. Suitable ceramic materials include but are not limited to metal oxides, metal nitrides, metal carbides, borosilicate glasses, and the like, such as $Al_2O_3$, AlN, $SiO_2$, $Si_3N_4$, SiC, and $ZrO_2$. Suitable metal materials include, but are not limited to stainless steel, Al, Ti, and W. The cover 32 has typically a planar surface; however, in order to improve the mechanical strength of the cover 32, a corrugated cover 32 may be used. For all practical purposes, the cover 32 is substantially impermeable to oxygen, water, and water vapor. The barrier properties of the hermetic package 30 are, therefore, determined by the adhesive seal 34.

The thin film getter 35 desirably has a thickness ranging from about 500 angstroms to about 5000 angstroms. The thin film getter 35 may be made of copper, aluminum, cobalt, chromium, iron, lithium, magnesium, nickel, tin, titanium, vanadium, tungsten, zinc, and other metals or metal alloys with similar properties. The use of copper is particularly suitable because copper getters change color as they react with oxygen, thereby giving a visual indication of oxidation when the cover 32 is a substantially non-opaque cover. Continued visual changes of the copper getter surface through time gives an indication as to whether a leak may be present in the hermetic package. Therefore, the use of both a substantially transparent or translucent cover 32 in tandem with a copper thin film getter 35 is a particularly suitable combination because chemical changes to the copper resulting from chemical reaction may be examined external to the volume sealed within the hermetic package 30. Other metals such as lithium provide similar visual queues like copper such that combination of lithium with a transparent or translucent cover may also be suitable for seal leak detection.

The thin film getter 35 is may be deposited onto interior surface 37 by sputtering, evaporation, or another suitable thin film process that allows the thin film getter 35 to be deposited within the adhesive seal line 34 using, for example, a deposition mask. The thin film getter 35 may also include an asymmetric feature 39, such as a notch, which allows for easy identification of the getter film side of a lid (e.g., interior surface 37 on lid 32). The presence of at least one asymmetric feature 39 on lid 32 allows for a quick visual determination of which side of the lid 32 contains the getter film 35. The asymmetric feature 39 may be incorporated into a mask design for depositing the getter film 35. In a hermetic package absent the getter 35 and having a copper anode current collector 18, the copper current collector 18 reacts rapidly with residual oxygen within the hermetic package at an adhesive 34 cure temperature of about 150° C. to form copper oxide as shown in the equation below:

$$2Cu + 0.5O_2 = Cu_2O. \qquad (2)$$

Consider, for example, a thin film battery 10 sealed with a 0.4 inch×0.4 inch lid 32. The sealed volume inside the adhesive seal 34 between the lid 32 and the substrate 12 would be about 0.01 cm³. In a theoretical scenario in which the gas trapped inside the hermetic package 30 is 100% air at room temperature, about 20% of the anode current collector 18 would be converted to $Cu_2O$ as per Equation (2) above, thereby compromising battery performance. The thin film getter 35 substantially reduces the undesirable effects of the residual oxygen by effectively redirecting some of the residual oxygen to react with the thin film getter 35.

The thin film getter 35 may also be used to decrease the undesirable effects of residual water or water vapor in the hermetic package 30. Lithium, like copper, changes visual appearance when reacted with oxygen, but lithium also changes appearance when reacted with water vapor. One disadvantage of using lithium as a thin film getter, however, is that the upper use temperature of such a battery is reduced to about 120° C. Nonetheless, other materials such as magnesium may be used as thin film getters for higher temperature applications. In a one exemplary embodiment, the thin film getter 35 is capable of withstanding solder reflow temperatures above about 265° C. Desirably, the hermetic barrier package 30 (including thin film getter 35) is capable of withstanding at least three consecutive reflow or surface mount assemblies at temperatures above about 265° C.

One or more thick film getters 41 may be used to substitute or supplement at least one thin film getter 35. Thick film getters 41 may include fine micron-sized particles of materials with high sorption capacities for water vapor and other gases (e.g., $N_2$ and $O_2$) dispersed in curable organic binders. The active materials in the thick film getter 41 preferably include zeolites (e.g., sodium aluminum silicate and calcium aluminum silicate) and/or metals such as zirconium, vanadium, and iron. The thick film getter 41 may be deposited on an interior surface of the hermetic package 30 such as interior surface 37 on lid 32 to a thickness ranging from about 25 to about 100 μm. A syringe dispensing or a screen printing process may be used to deposit the thick film getter 41 in the desired location. Examples of commercially available thick film getter materials are available from Cookson Electronics of Alpharetta, Ga. under the trade names STAYDRY SD1000 getter materials and HICAP2000 getter materials. Also available are glass plates with stage B epoxy or low melting glass (frit) seals and thick film $H_2O$ getters available from E.I. DuPont and Co. of Wilmington, Del. under the trade name DRYLOX cover glass. Other forms of thick film getters are discussed in US Patent Application Publication numbers 2006/0088663 and 2005/0104032 to Cho et al., both incorporated herein by reference.

With reference now to adhesive 34 shown in FIGS. 1 and 2, a thin bead of adhesive 34, such as an alumina-filled epoxy adhesive available from Epoxy Technology, Inc. of Billerica, Massachusetts under the trade names EPO-TEK H77 or H77T epoxy adhesive, is dispensed around the periphery of the battery 10 inside the edges of the substrate 12 while leaving a sufficient area of the current collectors 16 and 18 exposed for making electrical connection to the battery 10. A bead of the adhesive 34 may be applied to the support surface 14 of the substrate 12 using an automated dispenser available from Asymtek of Carlsbad, Calif. under the trade name DISPENSEMATE 550 automated dispenser or similar dispensing system.

Once the bead of adhesive 34 has been dispensed around the periphery of the battery 10, the cover 32 having a thickness ranging from about 0.1 to about 0.3 mm is placed on the bead of adhesive 34. The weight of the cover 32 may compress the bead of adhesive 34 to form a seal that is approximately 0.05 to about 0.2 mm thick and about 1 to about 2 mm wide, depending on the viscosity and shape of the bead of adhesive 34. Otherwise, the bead of adhesive 34 may be compressed to any desired thickness by a pick and place tool that is used to place the cover 32 on the bead of adhesive 34. Placement of the cover 32 on the bead of adhesive 34 may be performed in a vacuum or inert gas environment to reduce the amount of air or moisture that is entrapped in the gap 36 between the cover 32 and the battery 10. The assembly of battery 10, substrate 12, cover 32 and adhesive 34 is then heated to a temperature up to about 200° C. to cure the adhesive 34.

Alternatively, the adhesive 34 may be an ultraviolet (UV) curable adhesive such as a UV curable adhesive available from Epoxy Technology, Inc. under the trade names EPOTEK OG152 adhesive, EPOTEK OG142-17 adhesive, and EPOTEK OG142-13 adhesive. After placement of a transparent or translucent cover 32 on the bead of adhesive 34, the adhesive 34 may be cured by exposing the adhesive 34 to UV light using, for example, a UV curing system available from Henkel Loctite Corporation of Dusseldorf, Germany under the trade name ZETA 7410 UV curing system.

The barrier properties of adhesives 34, such as EPO-TEK H77 and H77T epoxy adhesives to oxygen and water vapor permeation are not available; however, the helium leak rate of EPO-TEK H77 epoxy adhesive is reported to be about $1 \times 10^{-8}$ cm$^3$/s at 32° C. and 90% RH over 100 hours at atmospheric pressure. The foregoing leak rate is the volume of helium in cm$^3$ that passes through a membrane that is 1 cm$^2$ in cross section and 1 cm thick at the specified temperature and relative humidity. Multiplying by the ratio of thickness to area of the membrane gives a permeability of helium at one atmosphere (atm) of pressure of $1 \times 10^{-8}$ cm$^3$-cm/cm$^2$-sec at 32° C. A report in the literature on the permeability of epichlorohydrin, a polymeric component of H77 and H77T, cites helium permeability at one atm He at 25° C. of about $0.4 \times 10^{-8}$ cm$^3$-cm/cm$^2$-sec, consistent with the value of H77T, and a nitrogen permeability of about $8 \times 10^{-11}$ cm$^3$-cm/cm$^2$-sec at one atm of nitrogen at 25° C. A survey of polymeric materials indicates that the measured permeability of oxygen ranges from about 2 to about 8 times higher than that of nitrogen. Therefore the permeability of oxygen through the epichlorohydrin polymer at 25° C. ranges from about $2 \times 10^{-10}$ cm$^3$-cm/cm$^2$-sec to $6 \times 10^{-10}$ cm$^3$-cm/cm$^2$-s at one atm of oxygen or from $4 \times 10^{-11}$ cm$^3$-cm/cm$^2$-sec to $10^{-10}$ cm$^3$-cm/cm$^2$-sec at 1 atm of air.

Other sealing materials for use as alternatives to epoxy adhesives include low temperature melting glasses (i.e., glass frits that have a sealing temperature ranging from about 320° to about 500° C.) such as DM2700/2800 and the DM2900 series sealing glass sold by Diemat, Inc. of Byfield, Mass. The glass phase is preferably dispersed in an organic binder and is dispensed by the same techniques used with EPOTEK H77 epoxy adhesive and similar epoxies. During production, after a thin film battery package is substantially assembled, a seal is made by heating the low melting glass composition in an oven, heating the low melting glass composition on a hot plate, heating the low melting glass composition using a laser beam, or heating the low melting glass composition by exposing the thin film battery package to a radiant heat source.

One gauge of thin film battery lifetime is determined by the time the capacity of the battery decreases to 80% of its rated value caused by reaction of the battery components with air or water vapor or by changes in the battery materials curing cycle. In order to understand the requirements of a hermetic barrier to prevent reaction of the battery components, especially the anode, with oxygen or water on exposure to air, the following example is given. In the example, a thin film battery with a 1 cm$^2$×3 µm thick lithium metal anode is used. Lithium metal is chosen for the example because lithium is the most reactive anode material and therefore provides the most stringent test of a barrier material. While the area of the battery and therefore the anode could have any value, a 3 µm thick lithium anode is typical of thin film lithium batteries. For a theoretically dense lithium film, with a density of $\rho = 0.534$ g/cm$^3$, the mass of lithium in the anode is 160 µg, and the number of moles of lithium, MW=6.941 g/mol, is 23.1 µmol. So, in order to lose no more than 20% of the capacity of the thin film battery due to reaction of the 1 cm$^2$×3 µm lithium metal anode with air, the amount of lithium reacted must be less than or equal to 32 µg or about 4.6 µmol.

As set forth above the bead of adhesive 34 dispensed around the periphery of the battery 10 is typically about 0.5 to about 0.7 mm thick and about 0.5 to about 1 mm wide. For a periphery having a perimeter of 4 cm enclosing a 1 cm$^2$ area containing the battery 10, a flattened bead of adhesive 34 may have a thickness of about 0.16 mm and is about 2 mm wide. Hence the total cross sectional area of the flattened bead of adhesive 34 is 0.064 cm$^2$. Assuming the permeability of H77T to oxygen in air to be equal the maximum estimated permeability of oxygen in air for epichlorohydrin to allow for any errors ($10^{-10}$ cm$^3$-cm/cm$^2$-sec), the transmission rate of $O_2$ through the flattened area of the adhesive bead 34 is about $3 \times 10^{-11}$ cm$^3$/sec ($10^{-10}$ cm$^3$-cm/cm$^2$-sec×0.064 cm$^2$/0.2 cm) or approximately $6.4 \times 10^{-15}$ mol/sec at one atmosphere of air at 25° C. With this transmission rate, the time to consume 20 percent of a 1 cm$^2$×3 µm thick lithium metal anode (about $5 \times 10^{-6}$ mol) by reaction with $O_2$ according to the following equation:

$$4Li + O_2 = 2Li_2O \tag{3}$$

is about 6 years. If the thickness of the bead of adhesive 34 is reduced to 0.08 mm, the time to consume 20 percent of the lithium metal film is increased to about 11 years. Other ceramic-filled, one and two component epoxy adhesives available from Epoxy Technology, Inc. and Aremco Products, Inc. of Valley Cottage, N.J. may be used in place of the alumina-filled epoxy adhesives described above provided the permeability of the adhesive is within an acceptable range for providing a desirable battery life.

Figure 3:
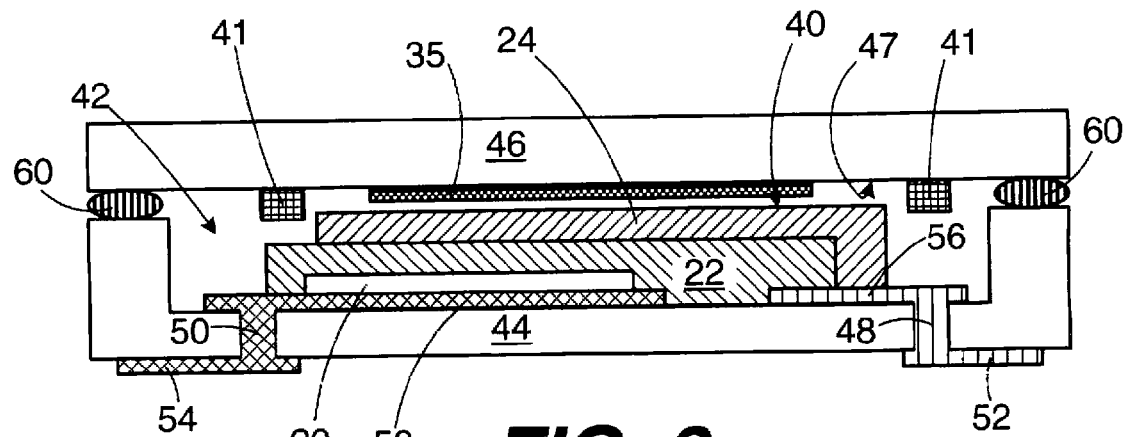
FIG. 3 is a cross-sectional view, not to scale, of a thin-film battery package including a thin film getter that has been hermetically sealed according to a second embodiment of the disclosure.

In a second embodiment, illustrated in FIG. 3, the battery 40 is deposited in a recessed area or pocket 42 of a substrate 44 and a cover 46 is hermetically sealed to the substrate 44 around a periphery of the pocket 42. The thin film getter 35 is attached to an interior surface 47 of cover 46. The thick film getter 41 may also be attached to an interior surface 47 in lieu of or in tandem with a thin film getter 35. In this embodiment, vias 48 and 50 may be etched through the substrate 44 to provide plated through-hole contacts 52 and 54 for the anode and cathode current collectors 56 and 58. The cover 46 may be sealed to the substrate 44 using brazing, laser welding, or an epoxy adhesive 60 as described above. In the alternative, a pocketed cover may be attached to a planar substrate by the foregoing methods. Chemical or dry etching techniques may be used to form the pocket 42 or cavity in the substrate 44 or pocketed cover.

Figure 4:
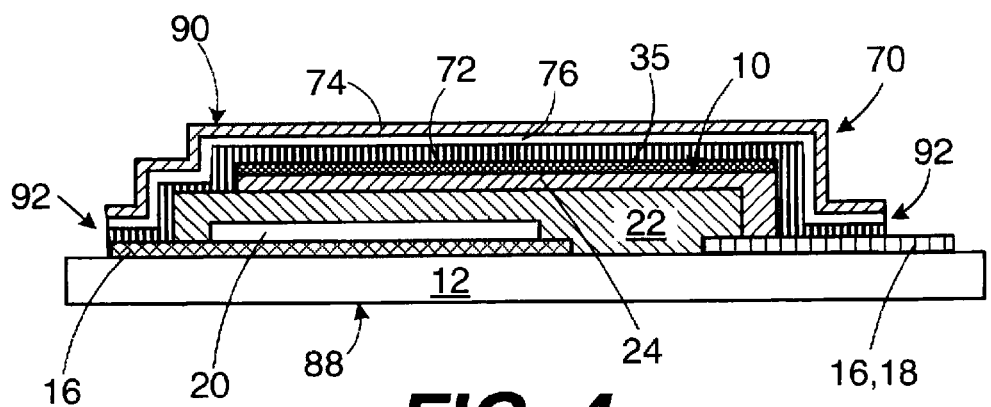
FIGS. 4 and 5 are cross-sectional views, not to scale, of a thin-film battery package that has been hermetically sealed according to a third embodiment of the disclosure before and after charging.
Figure 5:
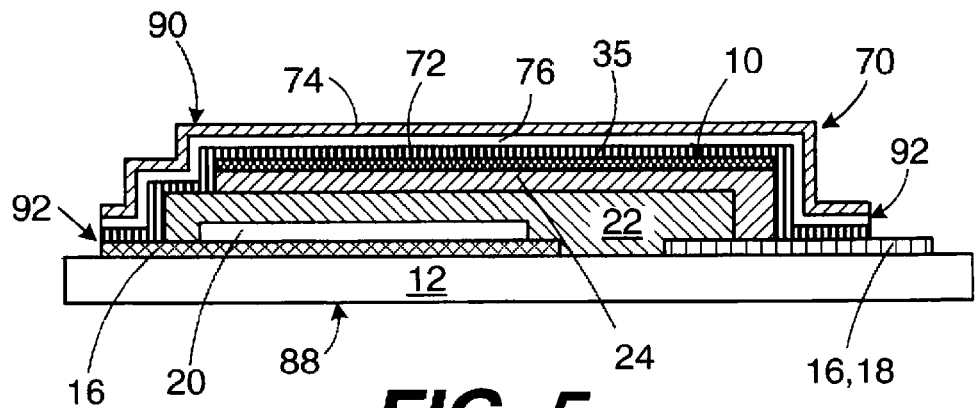

In some applications, such as providing power for semiconductor diagnostic wafers, the thin film battery must be a thin as possible. Accordingly, an alternative type of hermetic package is illustrated in FIGS. 4 and 5. In this embodiment, a multilayer hermetic sealing material 70 is used. The material 70 includes a polymeric sealing layer 72, at least one polymeric outer layer 74, and an inner metal foil layer 76 disposed between the polymeric layers 72 and 74. This embodiment also includes a thin film getter 35 as described in other embodiments above.

Suitable multilayer hermetic sealing materials 70 include, but are not limited to, materials available from University Products, Inc. of Holyoke, Mass. under the trade name MARVELSEAL 360 aluminized polyethylene and nylon barrier film and from Shield Pack LLC, of West Monroe, La. under the trade name SHIELD PACK CLASS PPD barrier liners. The foregoing MARVELSEAL and SHIELD PACK barrier materials contain two outer polymer layers 74, a metal foil layer 76, and a polymeric sealing layer 72. For example, the SHIELD PACK CLASS PPD baffler material consists of a 0.48 mil thick MYLAR polyester film outer layer, a 1 mil thick polyethylene layer, a 0.35 mil thick metal foil layer, and a 2.1 mil thick SURLYN sealing layer. SURLYN resin used for the sealing layer is a modified ethylene/methacrylic acid copolymer available from DuPont Packaging and Industrial Polymers of Wilmington, Del.

By contrast, the MARVELSEAL 360 barrier material has a nylon outer layer and an inner sealing layer of polyethylene. The transmission rates of water vapor and oxygen through the SHIELD PACK CLASS PPD barrier liners and MARVELSEAL 360 barrier materials, as cited in the respective product literature, are given in Table 1.

TABLE 1

Water Vapor and Oxygen
Transmission Rates Through Barrier Materials

| Barrier Material | Water Vapor Trans. Rate At 38° C., 90% RH (mol/cm$^2$-sec) | Oxygen Trans. Rate At 25° C., 1 atmosphere (mol/cm$^2$-sec) |
|---|---|---|
| SHIELD PACK CLASS PPD barrier liner | $1 \times 10^{-12}$ | $1 \times 10^{-15}$ |
| MARVELSEAL 360 barrier material | $5 \times 10^{-13}$ | $1 \times 10^{-16}$ |

The procedure for providing a hermetic seal for thin film batteries using the barrier material 70, described above, is to cover the battery 10 and substrate 12 with a piece of the barrier material 70 with the polymeric bonding layer 72 disposed adjacent the anode 24 of the battery 10. A portion of current collectors 16 and 18, as illustrated in FIGS. 1 and 2, is left exposed for making electrical contact to the battery. In the alternative, vias, such as vias 48 and 50 may be provided in the substrate 12, as described with reference to FIG. 3, to enable external contacts to be provided.

The barrier material 70 may be laminated to the battery 10 and substrate 12 under vacuum conditions in a vacuum laminator by heating a bottom surface 88 of the substrate 12 to a temperature ranging from about 115° to 140° C. for a few seconds while applying 3 to 50 psi pressure to an upper surface 90 of the barrier material 70 using a pressurized silicone rubber membrane. The temperature is then lowered to about 60° C., and the sealed batteries 10 are removed from the laminator.

While not desiring to be bound by theory, it is believed that the barrier material 70 is sealed to the battery 10 and substrate 12 though a process of melting and freezing of the bonding layer 72 during the heating and cooling steps of the process. Barrier properties of the barrier material 70 may be attributed to the metal foil layer 76, because the transmission rates of water vapor and oxygen through the polymeric layers 72 and 74 are relatively high.

Permeation of oxygen and water vapor into the sealed battery 10 mainly occurs through edges 92 where the bonding layer 72 is bonded to the substrate 12 and/or current collectors 16 and 18. From product literature, the permeability of oxygen through polyethylene and SURLYN resin is about $2 \times 10^{-13}$ mol-cm/cm$^2$-sec at one atmosphere of air at 25° C. The thickness of the bonding layer 72 is typically about 50 µm. Accordingly, the cross sectional area of a 4 cm perimeter is about 0.02 cm$^2$ (4 cm×50×10$^{-4}$ cm). Assuming a 2 mm wide seal provided by the bonding layer 72, the transmission rate of oxygen through the bonding layer 72 is $2 \times 10^{-14}$ mol/sec ($2 \times 10^{-13}$ mol-cm/cm$^2$-sec)×(0.02 cm$^2$/0.2 cm). With this transmission rate, the time to consume 20% of a 1 cm$^2$×3 µm thick lithium metal film by reaction with O$_2$ according to equation (2) above is about 22 months. Increasing the width of the bonding layer 72 seal from 2 to 3 mm increases the lifetime to about 33 months.

Because the bonding layer 72 is relatively compliant, it may be compressed upon expansion of the anode 24 without causing damage to the other layers 74 and 76 of the barrier material 70. The compressibility of the layer 72 is illustrated in FIGS. 4 and 5. In FIG. 4, the battery has not been charged, accordingly, and the anode 24 is in an unexpanded state. In FIG. 5, the battery has been charge, and the anode 24 is shown in an expanded state. As shown in FIG. 5, layer 72 is compressed when the anode expands 24 on charging.

Figure 6:
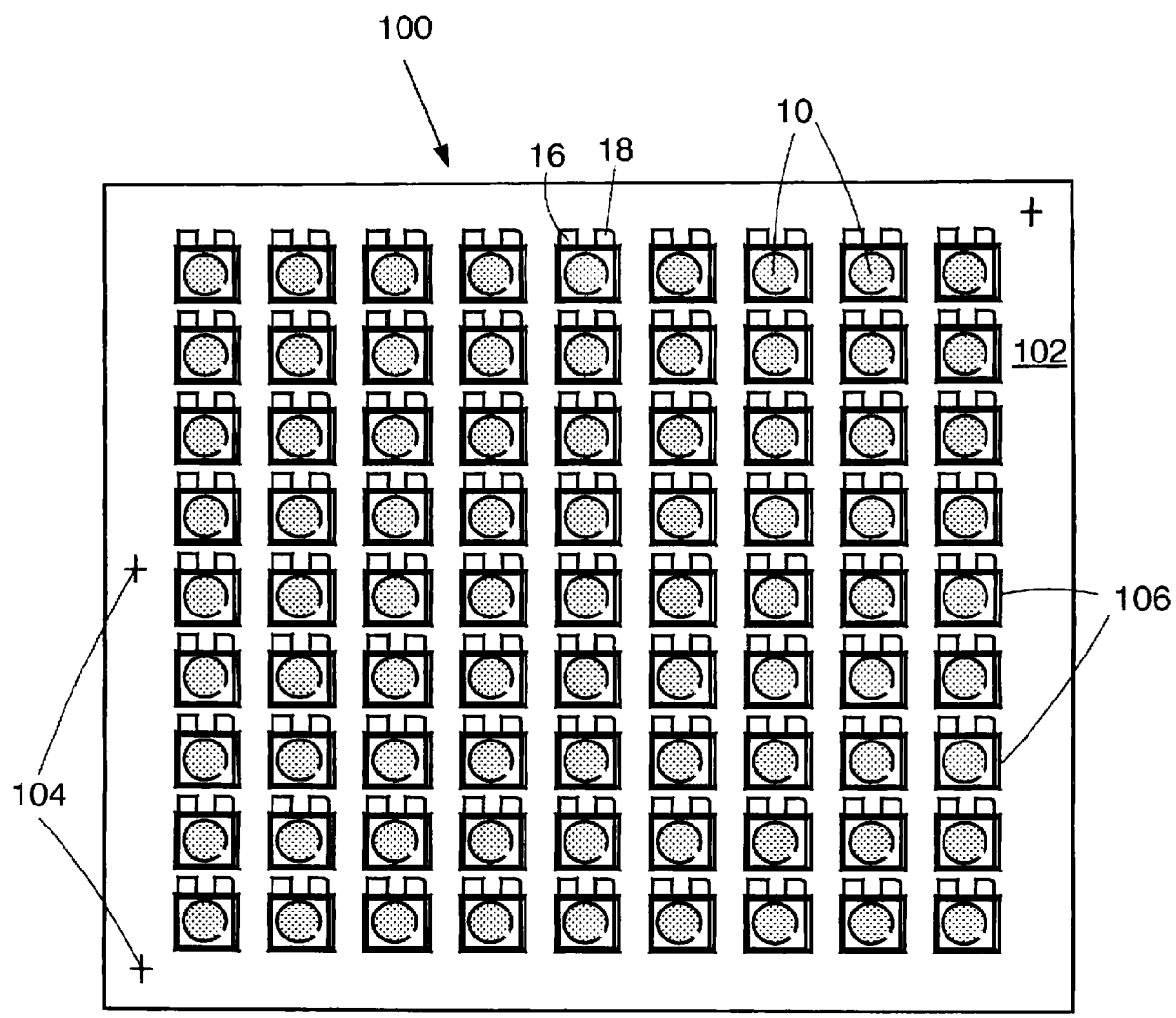
FIG. 6 is a plan view, not to scale, of an array of thin film battery packages on a substrate that has been hermetically sealed.

A manufacturing technique for hermetically sealing thin-film batteries is illustrated in FIG. 6. According to the method, an array 100 of thin film batteries 10 is fabricated on a single substrate 102. After depositing the various layers forming the current collectors 16 and 18, cathodes 20, electrolytes 22, and anodes 24, beads of adhesive 34 (FIGS. 1 and 2) are dispensed around a periphery of each of the batteries 10. Covers 32 (FIGS. 1 and 2), including thin film getters 35 and (additionally or alternatively) thick film getters 41, are placed on each battery 10 using a pick and place machine, and the substrate 102 is then heated to a temperature of at least about 120° C. to cure the adhesive 34. Alternatively, if a UV-curable epoxy adhesive 34 is used, the substrate and transparent or translucent covers 32 are exposed to UV light for a few seconds to cure the adhesive 34.

After curing the adhesive 34, the substrate 102 containing the array 100 of batteries 10 is placed on a vacuum chuck of a wafer prober, and each battery 10 is tested using two-point open circuit voltage and resistance measurements. The covers 32 of batteries 10 that fail the test are marked as defective with ink. The entire array 100 of batteries 10 is then diced using a dicing saw to provide individual batteries 10. The batteries 10 failing the test are discarded.

Alternatively, the current collectors 16 and 18 of each battery 10 may be contacted simultaneously before dicing by placing a "bed of nails" consisting of spring-loaded probes fixed into an insulating plate on top of the substrate 102. The pair of wires from each battery may be connected to channels of a battery tester such as a battery tester available from Maccor, Inc. of Tulsa, Okla. under the trade name MACCOR Series 4000 battery tester so that all of the batteries on the substrate 102 can be tested at the same time. Examples of suitable probes include probes available from Interconnect Devices, Inc. of Kansas City, Kans. under the catalog number R-100J-DE.

Two specific examples for illustrating the preparation of thin-film getter-coated lids 32 and subsequent attachment to batteries 10 are given below. For the purposes of these illustrative examples, the batteries 10 have a 0.5 inch by 0.5 inch footprint fabricated on 4.5 inch by 4.5 inch ceramic or semiconductor wafers or polymer film substrates 102.

EXAMPLE 1

A glass plate (from SCHOTT North America, Inc., of Elmsford, N.Y.) about 4.5 inches by about 4.5 inches by about 0.008 inches is mounted on low-tack wafer tape (Z18133-7.5 from Semiconductor Equipment Corporation of Moorpark, Calif.) using a vacuum laminator. The plate is scribed into about 0.402 inch by about 0.402 inch squares to a depth of about 0.0040 inches to about 0.0045 inches using a dicing saw. The scribed glass sheet is mounted onto a substrate holder and covered with a thin sheet of stainless steel or plastic into which about 0.27 inch diameter circles have been cut to form a mask. The circles preferably include a notch or other small feature to give deposited films an asymmetric feature 39 as shown in FIG. 2. Using dc magnetron sputtering, copper is deposited to a thickness of about 1000 to about 2000 Angstroms through the mask onto the glass leaving a pattern on each lid 32 with a shape as illustrated in FIG. 2. In this example, when a lid 32 is oriented so that the notch 39 is to the left at the bottom edge, the film side is up; with the notch 39 on the right at the bottom edge, the film side is down. After copper deposition, the lids 32 are separated from the wafer tape and loaded into a matrix tray for pick and place with the getter film side down so that the thin film getters 35 will be inside of the cavity defined by the hermetic packages 30 when the lid 32 is placed above the battery 10 on the adhesive lines. The thin film getter 35 could have any shape in order to conform closely to the shape of the lid 32 without interfering with the adhesive 34. Alternatively, thick film getter 41 could be used in addition to or instead of thin film getter 35. In the case of rectangular getter (35 and/or 41) shapes, the asymmetric feature 39 can be made at one of the corners or at any position not along an axis of symmetry.

EXAMPLE 2

Alignment fiducials 104 illustrated in FIG. 6 are deposited onto the battery substrate 102 at different locations, near corners, edges, center, etc., during deposition of the cathode current collectors. The same pattern of fiducials 104 is deposited onto the about 4.5 inch by about 4.5 inch by about 0.008 inch glass plates mounted on wafer tape during deposition of the getter films (35 and/or 41). After dispensing adhesive lines 106 on the thin film battery substrate 102 including the outside edge of the substrate 102, the substrate 102 and glass plate are aligned to the fiducials 104 on each other using a machine vision system incorporated into a pick and place tool. Machine vision systems are available from PPT Vision, Inc., of Eden Prairie, Minn., and pick and place tools are available from Automated Production Systems, Inc., of Huntingdon Valley, Pa. Specialized tools for aligning and placing glass plates onto substrates are manufactured, for example, by Lantechnical Services, of Tokyo, Japan. This procedure has the advantage of encapsulating the entire battery substrate so that the exposed copper anode current collector tabs are protected from exposure to a high oxygen concentration during an adhesive cure step. After curing, the wafer 100 with lid is diced in order to separate the individual thin film battery packages and expose the cathode current collector tabs 16 and anode current collector tabs 18.

An alternative method for making at least one thin film battery package with the hermetic properties described herein includes the steps of providing a substrate 12 made of flexible liquid crystal polymers (LCP), fabricating a thin film battery stack 26 on the LCP substrate 12, providing a lid 32 made of LCP including at least one thin and/or thick film getter (35 and/or 41), and sealing the LCP lid 32 with the LCP substrate 12. LCPs have water vapor barrier properties superior to polyimides, such as the material sold under the trade name KAPTON polyimide film by E.I. Dupont and Co. of Wilmington, Del., which is currently used for constructing other semiconductor devices. Moreover, LCPs are more stable at higher temperatures than polyimides. LCPs with or without copper cladding may be obtained from Rogers Corporation of Chandler, Ariz. The copper cladding may be used as a heat sink for thin film batteries. The step of sealing the LCP substrate 12 with the LCP lid 32 is preferably performed using a light emitting device such as a laser to melt the edges of the LCP lid 32 and the LCD substrate 12. However, those skilled in the art appreciate that a wide variety of sealing techniques may be used to seal the LCP lid 32 and the LCP substrate 12 to one another.

While the foregoing embodiments are applicable to any thin film, rechargeable battery having anodes 24 which expand on charging, the embodiments are particularly applicable to lithium or lithium-ion thin film batteries containing doped solid electrolytes. Particularly preferred doped electrolytes for a lithium or lithium ion battery incorporate a sulfide ion and/or aluminum ion.

A sulfide ion-doped electrolyte is preferably a solid amorphous composition represented by the following formula:

$Li_wPO_xN_yS_z$ where $2x+3y+2z=5+w$, x ranges from about 3.2 to about 3.8, y ranges from about 0.13 to about 0.46, z ranges from greater than zero up to about 0.2, and w ranges from about 2.9 to about 3.3. Compositions of the foregoing formula, may contain from about 37.4 to about 39.7 atomic percent lithium ion, from about 11.8 to about 13.1 atomic percent phosphorus ion and from about 41.7 to about 45.4 atomic percent oxygen ion in addition to the sulfide ion and nitrogen ion. Examples of electrolyte compositions having the preferred S/P ratios are given in the following Table 2:

TABLE 2

| Li ion (atomic %) | P ion (atomic %) | Oxygen ion (atomic %) | Nitrogen ion (atomic %) | Sulfide ion (atomic %) |
|---|---|---|---|---|
| 39.43 | 11.95 | 45.40 | 2.03 | 1.19 |
| 39.66 | 12.02 | 44.47 | 2.64 | 1.20 |
| 37.81 | 13.04 | 43.02 | 4.82 | 1.30 |
| 37.86 | 13.05 | 41.78 | 6.01 | 1.31 |
| 39.36 | 11.93 | 45.33 | 1.59 | 1.79 |
| 37.74 | 13.02 | 42.95 | 4.34 | 1.95 |
| 38.94 | 11.80 | 44.90 | 2.60 | 1.77 |
| 37.40 | 12.89 | 41.84 | 5.93 | 1.93 |

Electrolytes of the foregoing composition may be used in thin-film batteries having oxide-based cathodes, such as $LiCoO_2$ and $LiMn_2O_4$, $LiNiO_2$, and $V_2O_5$ that operate at potentials above 3.8 volts.

The amount of aluminum ion in the electrolyte composition of an aluminum ion-doped electrolyte is expressed in terms of an aluminum ion to phosphorus ion ratio (Al/P). The Al/P ratio may range from greater than zero to about 0.5. Optimum results may be obtained by providing an Al/P ratio ranging from about 0.1 to about 0.3.

As set forth above, the aluminum ion-doped electrolyte film may optionally be doped with a sulfide ion. When present, the amount of sulfide ion in the electrolyte composition is expressed in terms of a sulfide ion to phosphorus ion ratio (S/P). Accordingly, the S/P ratio may range from greater than zero up to about 0.2, desirably from about 0.10 to about 0.15, and most desirably about 0.15.

Electrolyte films incorporating an aluminum ion and, optionally, a sulfide ion are suitably solid amorphous compositions represented by the following formula:

$$Li_tP_xAl_yO_uN_vS_w,$$

where $5x+3y=5$, $2u+3v+2w=5+t$, t ranges from about 2.9 to about 3.3, x ranges from about 0.94 to about 0.85, y ranges from about 0.094 to about 0.26, u ranges from about 3.2 to about 3.8, v ranges from about 0.13 to about 0.46, and w ranges from zero to about 0.2. Compositions of the foregoing formula, may contain from about 30 to about 50 atomic percent lithium ion, from about 10 to about 15 atomic percent phosphorus ion, and from about 35 to about 50 atomic percent oxygen ion in addition to the aluminum ion, sulfide ion, and nitrogen ion. Examples of electrolyte film compositions having acceptable Al/P ratios are given in the following table:

TABLE 3

| Li ion (atomic %) | P ion (atomic %) | Al ion (atomic %) | O ion (atomic %) | N ion (atomic %) | S ion (atomic %) |
| --- | --- | --- | --- | --- | --- |
| 32.26 | 10.84 | 3.19 | 42.09 | 5.87 | 0.00 |
| 39.11 | 11.55 | 2.62 | 43.31 | 6.04 | 0.00 |
| 38.95 | 11.90 | 1.96 | 43.14 | 6.01 | 0.00 |
| 38.80 | 12.24 | 1.30 | 42.97 | 5.99 | 0.00 |
| 40.12 | 10.85 | 3.19 | 42.11 | 5.87 | 1.05 |
| 40.03 | 11.16 | 2.54 | 41.86 | 5.83 | 1.12 |
| 39.94 | 11.47 | 1.89 | 41.60 | 5.80 | 1.19 |
| 39.82 | 11.79 | 1.25 | 41.40 | 5.77 | 1.22 |
| 40.93 | 10.52 | 3.09 | 40.83 | 5.69 | 20.3 |
| 40.89 | 10.80 | 2.45 | 40.50 | 5.65 | 2.16 |
| 40.86 | 11.08 | 1.83 | 40.18 | 5.60 | 2.29 |
| 40.76 | 11.38 | 1.21 | 39.94 | 5.57 | 2.35 |

Electrolyte films of the foregoing composition may be used in thin-film batteries having oxide-based cathodes, such as $LiCoO_2$ and $LiMn_2O_4$, that operate at potentials above 3.8 volts.

Having described various aspects, exemplary embodiments, and several advantages thereof, it will be recognized by those of ordinary skills that the disclosed embodiments are susceptible to various modifications, substitutions and revisions within the spirit and scope of the appended claims.

What is claimed is:

1. A method for improving the useful life of at least one thin film battery containing a solid electrolyte and an anode that expands on charging, comprising providing a hermetic barrier package for the at least one thin film battery that includes an anode expansion absorbing structure and providing a thin film getter disposed at least on an interior surface of the hermetic barrier package.

2. The method of claim 1 wherein the thin film getter comprises a material selected from the group consisting of aluminum, cobalt, chromium, copper, iron, lithium, magnesium, nickel, tin, titanium, vanadium, tungsten, and zinc.

3. The method of claim 1, further comprising providing a thick film getter disposed on the interior surface of the chamber.

4. The method of claim 3, wherein the thick film getter comprises one or more zeolites.

5. The method of claim 3, wherein the thick film getter comprises one or more active metal particles dispersed in at least one curable organic binder.

6. The method of claim 3, wherein the thick film getter is deposited on the interior surface of the chamber by a syringe.

7. The method of claim 3, wherein the thick film getter is deposited on the interior surface of the chamber by screen printing.

8. The method of claim 1 further comprising encapsulating at least one thin film battery using a glass composition having a sealing temperature ranging from about 320° to about 500° C.

9. The method of claim 8 wherein the encapsulating step is conducted using a technique selected from the group consisting of heating glass composition in an oven, heating the glass composition on a hot plate, heating the glass composition using a laser beam, and heating the glass composition by exposing the at least one thin film battery to a radiant heat source.

10. The method of claim 8, wherein the glass composition comprises glass frits.

11. The method of claim 1, further comprising encapsulating a plurality of thin film batteries on a wafer using a single lid plate, thereby forming a plurality of thin film battery packages.

12. The method of claim 11 further comprising dicing the plurality of thin film battery packages to separate the thin film battery packages and to expose functional features of the separated thin film battery packages.

13. A thin film battery package comprising a solid electrolyte, an anode that expands upon charging, and a hermetic barrier package, the hermetic barrier package including an anode expansion absorbing structure and a thin film getter disposed at least on an interior surface of the hermetic barrier package.

14. The thin film battery package of claim 13 wherein the thin film getter comprises at least one thin film layer selected from the group consisting of aluminum, cobalt, chromium, copper, iron, lithium, magnesium, nickel, tin, titanium, vanadium, tungsten, and zinc film layers.

15. The thin film battery package of claim 13 further comprising a thick film getter disposed on the interior surface of the chamber.

16. The thin film battery package of claim 13, wherein the thick film getter comprises one or more zeolites.

17. The thin film battery package of claim 13, wherein the thick film getter comprises one or more active metal particles dispersed in at least one curable organic binder.

18. The thin film battery package of claim 13 comprising a thin film getter capable of withstanding a temperature greater than about 265° C. during reflow assembly of the battery to an electronic component.

19. The thin film battery package of claim 13, wherein the hermetic barrier package comprises a multilayer barrier foil containing a compressible polymeric film layer adjacent the anode.

20. The thin film battery package of claim 19, wherein the compressible polymeric film layer adjacent the anode is selected from the group consisting of polyethylene and an ethylene/methacrylic acid copolymer.

21. A semiconductor diagnostic wafer comprising the thin film battery package of claim 13.

22. A tubeless tire having sidewalls comprising a tire sensor containing the thin film battery package of claim 13 imbedded in the sidewalls of the tire.

23. A wireless sensor comprising the thin film battery package of claim 13.

24. A thin film battery package comprising a solid electrolyte, an anode that expands upon charging, and a hermetic barrier package, the hermetic barrier package including an anode expansion absorbing structure and a thick film getter disposed on at least an interior surface of the hermetic barrier package.

25. The thin film battery package of claim 24, wherein the thick film getter comprises one or more zeolites.

26. The thin film battery package of claim 24, wherein the thick film getter comprises one or more active metal particles dispersed in at least one curable organic binder.

27. A method for making at least one thin film battery package comprising the steps of attaching thin film battery components to a liquid crystal polymer substrate, encapsulating the thin film battery components including at least one film getter with a liquid crystal polymer lid, and substantially sealing the thin film battery components within the liquid crystal polymer substrate and liquid crystal polymer lid.

28. The method of claim 27, wherein the sealing step comprises melting the edges around the lid and the substrate to substantially seal the thin film battery components within the liquid crystal polymer substrate and liquid crystal polymer lid.

29. A thin film battery package comprising a solid electrolyte, an anode that expands upon charging, and a hermetic barrier package consisting essentially of liquid crystal polymer, the hermetic baffler package including an anode expansion absorbing structure, and at least one film getter disposed on at least an interior surface of the hermetic barrier package.

30. The thin film battery package of claim 29 wherein at least one film getter comprises a thin film getter.

31. The thin film battery package of claim 29 wherein at least one film getter comprises a thick film getter.

* * * * *